UNITED STATES PATENT OFFICE.

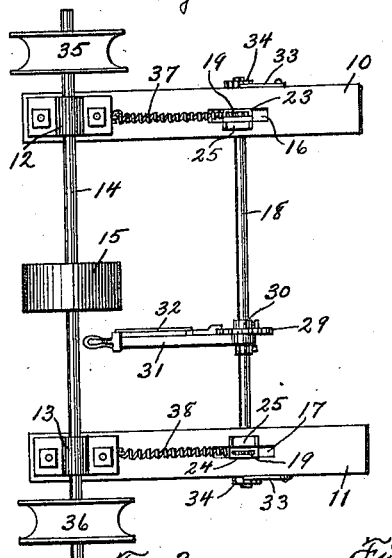
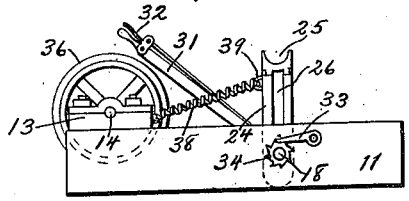
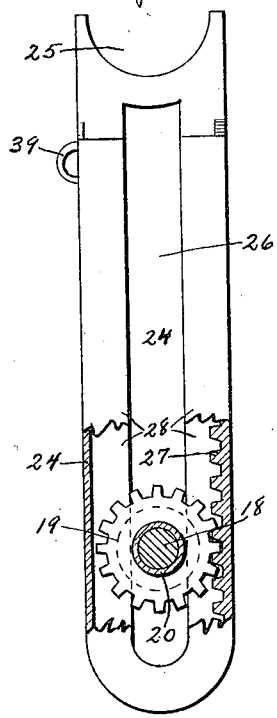
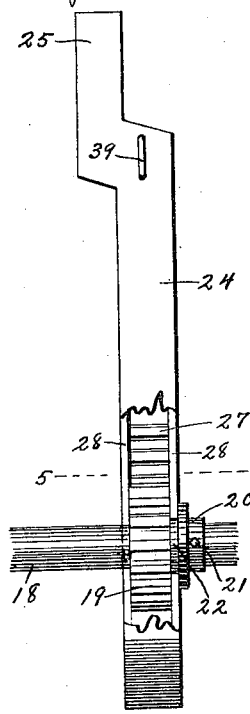
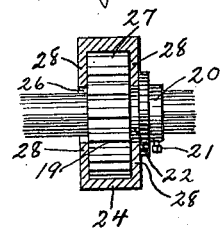

CHARLES JONES, OF WEBSTER CITY, IOWA.

AUTOMOBILE LIFTING AND POWER JACK.

1,320,474.   Specification of Letters Patent.   Patented Nov. 4, 1919.

Application filed November 18, 1918.   Serial No. 263,079.

*To all whom it may concern:*

Be it known that I, CHARLES JONES, a citizen of the United States of America, and resident of Webster City, Hamilton county, Iowa, have invented a new and useful Automobile Lifting and Power Jack, of which the following is a specification.

The object of this invention is to provide an improved power attachment adapted to be actuated by the rear drive wheels of a motor vehicle to supply power to a transmission member such as a belt pulley.

The further object of this invention is to provide improved means for elevating the rear drive wheels of an automobile and transmitting power from such wheels.

A further object of this invention is to provide an improved construction for a mechanism for engaging, lifting and supporting the rear axis of a motor vehicle to permit the drive wheels to be employed in driving a power shaft.

A further object of this invention is to provide improved means for operating the jack standards.

A further object of this invention is to provide an improved construction whereby the jack standards may yield slightly to compensate for inequalities of the tread surfaces of the drive wheels in their contact with the power pulleys.

My invention consists in the construction, arrangement and combination of elements hereinafter set forth, pointed out in my claims and illustrated by the accompanying drawing, in which—

Figure 1 is a plan of my improved device and Fig. 2 is a side elevation of the same. Fig. 3 is a side elevation, partly in section, on an enlarged scale, illustrating one of the jack standards and the shaft and pinion coöperating therewith. Fig. 4 is an elevation at right angles to Fig. 3, a portion being broken away to reveal internal construction. Fig. 5 is a cross-section on the line 5—5 of Fig. 4.

In the construction of the device as shown a frame is provided including spaced parallel sills 10, 11 suitably connected. Bearings 12, 13 are mounted on the rear end portions of the sills 10, 11 and a shaft 14 is arranged transversely of the rear portion of the frame and journaled in said bearings. A belt pulley 15 is fixed to the shaft 14 and is adapted for transmitting power from said shaft to any desired mechanism to be driven.

Vertical mortises 16, 17 are formed in the sills 10, 11 in front of the bearings 12, 13 and a shaft 18 is mounted transversely between said sills and has its end portions journaled in said sills adjacent said mortises. A pinion 19 is mounted on the shaft 18 in each of the mortises 16, 17, and each of said pinions is formed with an integral collar 20 on its outer side through which a set screw 21 is mounted to engage said shaft; and each collar is also formed with a peripheral groove 22 adjacent the pinion. Jack standards 23, 24 are provided, and each is formed at its upper end with a seat 25 adapted to engage the fixed tubular rear axle of a motor vehicle. Each jack standard 23, 24 is formed with a longitudinal slot 26 embracing the shaft 18 and on one side of said slot is formed with a longitudinally extending rack 27 in mesh with the adjacent pinion 19. On each side each jack standard 23, 24 is formed with a pair of flanges, designated by the numerals 28, extending toward the shaft 18, and outlining the side margins of the notch 26 and also forming a housing snugly containing a pinion 19. The jack standards 23, 24 are offset laterally near their upper ends a distance corresponding substantially to the face width of the racks 27 and pinions 19, and the flanged housings thereof are open at their upper ends in the horizontal planes of said offsets. By this means provision is made for inserting the pinions 19 within the housings of the jack standards before setting them on the shaft 18; it being desirable to form each of said jack standards in one piece by casting.

A toothed wheel 29 is formed with an integral set collar 30 by means of which it is secured to the shaft 18 and a hand lever 31 is pivoted on said shaft adjacent to and formed with common spring pressed detent devices 32 adapted to engage said toothed wheel. By this means the shaft 18 may be rotated manually by successive actuations of the lever 31 to engage and turn the toothed wheel 29. A pawl 33 on the frame 10-11, engaging a ratchet wheel 34 on the shaft 18, serve to prevent reverse rotation of the shaft 18 between successive manual operations through the lever 31.

In practical operation a motor vehicle to be employed in connection with the device is moved reversely or otherwise suitably positioned with its rear axle extending transversely above the sills 10, 11 adjacent the shaft 18. The jack standards 23, 24 are manually positioned with their seats 25 in engagement with the rear axle of the vehicle and then the shaft 18 is rotated by means of the hand lever 31, detent devices 32 and toothed wheel 29. This causes a rotation of the pinions 19 and an upward movement of the racks 27 and with them of the jack standards, lifting the vehicle axle and raising the rear driving wheels of the vehicle clear of the supporting surface. The vehicle wheels are then brought into frictional engagement with grooved wheels 35, 36 fixed to end portions of the shaft 14 and when the engine of the vehicle is operated its driving wheels turn said grooved wheels, the shaft 14 and belt pulley 15 and power is transmitted therefrom to operate a follower device. Coil springs 37, 38 are provided and are secured at one end to the sills 10, 11 respectively and are adapted to have their opposite ends detachably secured to eyes 39 in the rear sides of the upper end portions of the jack standards 23, 24. It is the function of the springs 37, 38 to hold the vehicle wheels in frictional engagement with the grooved wheels 35, 36 and to permit slight forward yielding of the standards to compensate for inequalities in the tread surfaces of the vehicle wheels, thus avoiding jars and shocks in the operation of the device and securing a smooth running mechanism. In such yielding of the jack standards the racks 27 oscillate on and at the points of engagement with the pinions 19, and such yielding of either jack standard is independent of the other and of the shaft 18.

I claim as my invention—

1. A device of the class described, comprising a frame, a shaft journaled therein, a transmission pulley on said shaft, spaced drive pulleys on said shaft and adapted for frictional contact with the drive wheels of a vehicle, a second shaft journaled in said frame, pinions fixed to said second shaft, jack standards mounted for oscillation and for vertical movement in said frame and formed with longitudinal racks in mesh with said pinions, said standards also being provided with means for engaging the rear axle of a vehicle, and means for operating said second shaft.

2. A device of the class described, comprising a frame, a shaft journaled therein, a transmission pulley on said shaft, spaced drive pulleys on said shaft adapted for frictional contact with the drive wheels of a vehicle, a second shaft journaled in said frame, pinions fixed to said second shaft, jack standards mounted for oscillation and for vertical movement in said frame and formed with longitudinal racks in mesh with said pinions, said standards also being provided with means for engaging the axle of a vehicle, means for manually operating said second shaft, and yielding means adapted to connect the upper portions of said standards to the frame.

3. A device of the class described, comprising a frame, a shaft journaled therein, a transmission pulley on said shaft, spaced drive pulleys on said shaft adapted for frictional contact with the drive wheels of a vehicle, a second shaft journaled in said frame, pinions fixed to the second shaft, jack standards mounted for oscillation and for vertical movement in said frame and formed with longitudinal racks in mesh with said pinions, said standards also being provided with means for engaging the axle of a vehicle, a toothed wheel fixed to the second shaft, a hand lever pivoted on said shaft and provided with detent devices for engaging said toothed wheel, and interengaging pawl and ratchet devices on said frame and second shaft to prevent reverse rotation of the latter.

4. A device of the class described, comprising a frame, a shaft journaled therein, a transmission pulley on said shaft, spaced drive pulleys on said shaft adapted for frictional contact with the drive wheels of a vehicle, a second shaft journaled in said frame, a pair of pinions fixed to the second shaft, jack standards formed with longitudinal slots embracing the second shaft and with racks in said slots meshing with said pinions, said standards also being provided with means for engaging the axle of a vehicle, and means for manually rotating the second shaft.

Signed at Webster City, in the county of Hamilton and State of Iowa, this 28th day of October, 1918.

CHARLES JONES.

Copies of this patent may be obtained for five cents each, by addressing the "Commissioner of Patents, Washington, D. C."